United States Patent Office
3,839,408
Patented Oct. 1, 1974

3,839,408
CONTINUOUS PURIFICATION OF ADIPONITRILE
Wolfgang Arend and Karl Eisfeld, Ludwigshafen, Peter Haug, Bad Duerkheim, Emil Himmelhan and Heinrich Scholz, Heidelberg, and Anton Wegerich, Limburgerhof, Germany, assignors to Badische Anilin- & SodaFabrik Aktiengesellschaft, Ludwigshafen (Rhine), Germany
No Drawing. Filed Sept. 27, 1972, Ser. No. 292,634
Claims priority, application Germany, Oct. 5, 1971, P 21 49 603.7
Int. Cl. C07c 121/26
U.S. Cl. 260—465.8 R
10 Claims

ABSTRACT OF THE DISCLOSURE

Continuous purification of adiponitrile by cooling the crude adiponitrile in a crystallization zone, separating the mixture of finely divided solid in liquid adiponitrile, washing the solid adiponitrile with liquid adiponitrile, and returning the separated adiponitrile mother liquor to the crystallization zone, the cooling of the crude adiponitrile being carried out indirectly by evaporating liquid ammonia. Some of the mother liquor obtained is returned to the crystallization zone immediately and the remainder after distillation.

---

This invention relates to a process for the continuous purification of adiponitrile.

It is disclosed in German Printed Application No. 1,190,929 that impure adiponitrile can be converted in a crystallization apparatus into a suspension of finely divided solid adiponitrile in liquid adiponitrile, the solid and liquid separated from one another and the liquid dinitrile returned to the crystallization apparatus, or the crystallization and separation processes may be repeated in one or more than one further crystallization apparatus. This method gives an adiponitrile of satisfactory purity.

We have now found that in carrying out the said method adiponitrile can be purified continuously with great advantage as regards expenditure of energy by cooling the adiponitrile to be purified in a crystallization zone so that a suspension of finely divided solid adiponitrile in liquid adiponitrile is formed, separating this mixture by methods conventionally used for separating solids from liquids, washing the solid dinitrile with liquid adiponitrile, and returning the separated adiponitrile mother liquor to the crystallization zone, the cooling of the adiponitrile to be purified being carried out indirectly by evaporation of liquid ammonia and mother liquor obtained after separating the solid dinitrile being returned to the crystallization zone for the most part immediately and for the rest after distillation.

The dinitrile used as starting material may have been prepared by any known method. For example, adiponitrile which has been obtained from 1,4-dichlorobutane and an alkali metal cyanide, from adipic acid and ammonia at elevated temperature in contact with a water-eliminating catalyst, by hydrogenating dimerization of acrylonitrile by means of sodium amalgam or electrolytically, or by hydrogenation of dihydromuconitrile may be used.

Naturally a prepurification of the dinitrile may be carried out by a conventional method, for example by treatment with acids, acid salts, for example sodium bisulfate, or with oxidizing agents, for example nitric acid or potassium permanganate, or absorbents, for example activated carbon, aluminum oxide or silica gel, and also by ion exchangers, treatment with bisulfate and separation of the solid residue, or a simple distillation in which impurities having a higher or lower boiling point than adiponitrile and products which cannot be distilled are removed. The use of adiponitrile having a melting point above 0° C. as starting material is preferred.

The dinitrile is cooled until a suspension of finely divided solid adiponitrile in liquid adiponitrile is obtained. This is achieved for example, depending on the purity of the dinitrile to be purified, by cooling to a temperature of 1° to 4° C. below the setting point of pure adiponitrile (2.55° C.) from precooled liquid dinitrile which has if necessary been filtered. To avoid supercooling of the liquid melt it is advantageous to add solid crystals of adiponitrile. The amount of dinitrile allowed to crystallize is conveniently such that crystal suspensions are obtained having a solids content of from 20 to 60%, preferably 30 to 50%, by weight. The preferred solids content depends on the separating apparatus used.

The cooling of the dinitrile in accordance with this invention is carried out indirectly through the wall of the crystallizing apparatus. Liquid ammonia is passed upwardly through the cooling jacket of the crystallizing apparatus parallel to the flow of adiponitrile, the liquid ammonia boiling by absorption of the heat of crystallization of the adiponitrile. The heat-transferring surfaces of the cooling jacket should be flushed well by liquid ammonia. After the ammonia has left the cooling jacket it is separated in a separator into liquid and vaporous fractions. The liquid fraction is returned immediately to the cooling jacket of the crystallizing apparatus and the vaporous fraction is liquefied before it is returned. The amount by weight of liquid ammonia passed through the cooling jacket per unit time is conveniently from once to five times, preferably from twice to three and a half times the amount of ammonia which is necessary to absorb as heat of evaporation the heat evolved in the crystallization of the adiponitrile. Calculation of the heat of crystallization evolved is based on the formation of a 50% by weight suspension of crystals of the adiponitrile to be purified.

The amount of coolant passed through depends on the throughput of adiponitrile to be purified and the percentage desired in the crystal suspension. Apparatus which permit a throughput of from about 2000 to 6000 kg., particularly from 3000 to 4500 kg., of adiponitrile per hour have proved to be convenient. The temperature at which the liquid ammonia is introduced into the cooling jacket of the crystallization apparatus is conveniently within the range from −18° to −6° C. The liquid ammonia is under the autogenous pressure prevailing at the temperature chosen. The temperature of the liquid ammonia which is most favorable at the throughput chosen may be ascertained in a simple preliminary experiment.

It is often advantageous in order to achieve well-formed crystals to allow the crystal suspension to remain for some time at the crystallization temperature either in the crystallization apparatus itself or in a separate holding means, for example for from one hour to five hours.

The particle size which should be aimed at in the supension depends on the separation method and the separation equipment which is to be used. Generally speaking particles having a mean diameter of from 0.1 to 1 mm., particularly from 0.2 to 0.5 mm., can be separated well and can be washed out well if this is necessary.

Conventional crystallization apparatus may be used. Cylindrical crystallizers provided with scrapers have proved to be particularly suitable. Suitable apparatus are described for example in German Patent Application P 17 94 044.2–43. It is merely necessary that these apparatus should have a cooling jacket in which liquid ammonia can be kept boiling at the temperature chosen.

The dinitrile to be purified is conveniently supplied upwardly through the crystallization apparatus. The suspension of crystals is conveniently passed through an overflow into a receiver and thence into a separating means. Separation can be carried out in all conventional separating equipment, for example filter presses, vacuum filters, pressure filters or centrifuges of various designs. It is preferred to use equipment in which it is possible to carry out a washing of the separated solid and in which it is also possible to decrease residual liquid by the use of pressure.

It has proved to be favorable to wash the separated crystals with pure liquid dinitrile which is conveniently obtained by partial melting of the separated crystals, i.e. the crystals are first separated, adherent mother liquor is separated as far as possible and the crystals are melted, for example by supplying hot air or by heat radiation, to such an extent that the amount necessary for washing is liquefied.

This dinitrile which is used for washing is returned, with or without a small portion of the mother liquor, to the crystallization zone.

The mother liquor separated from the crystals is separated according to the invention into two portions which are recycled separately to the crystallization zone. The major portion is returned direct to the crystallization zone either together with the adiponitrile to be purified or by itself. The remainder is first subjected to purification by distillation and only then returned to the crystallization zone. It has proved to be advantageous for from 55 to 90%, particularly from 65 to 85%, by weight of the mother liquor to be returned direct to the crystallization zone and the remainder to be returned to the crystallization zone after it has been distilled. The amount of dinitrile used for washing is not included in these figures.

The portion of mother liquor to be distilled is conveniently freed from constituents having a lower boiling point than the dinitrile in a column at a bottoms temperature of from about 180° C. to 220° C. and at from 30 to 50 mm. Some of the dinitrile and the contaminant 1-cyanocyclopentanimine-2 are distilled off in a second column at a bottoms temperature of from about 200° to 210° C. and at from about 50 to 70 mm. The cyanocyclopentanimine is conveniently separated from the distillate by crystallization. Removal of the imine should be carried out to such an extent that the content is kept below 2% by weight in the mother liquor in the dinitrile crystallization. If this content is exceeded there is a risk that the dinitrile/cyanocyclopentanimine eutectic point will be exceeded and the contaminant will be crystallized with the pure dinitrile.

When an unusually contaminated dinitrile is used, the purification according to the invention may be repeated if necessary.

The process according to the invention gives adiponitrile which is practically colorless, which is extremely easy to process and which satisfies the usual requirements as to purity without any further treatment. It is not necessary to introduce extraneous substances such as solvent into the dinitrile, for example for washing the crystals. The economics of the process should be particularly emphasized. The transfer of heat of crystallization of the adiponitrile to the coolant ammonia is particularly favorable from the points of view of energy and apparatus because this heat can be removed again from the ammonia in refrigeration plant. When brine cooling is used, for example, a heat exchanger is necessary in which the brine has to be cooled to the necessary temperature in an ammonia evaporator. Moreover transfer of heat from the brine to the surface of the crystallizer is substantially less. When boiling ammonia is used, a mixture of vapor and liquid flows through the outer jacket of the crystallizer so that transfer of heat is increased to a multiple.

The division of the mother liquor into two recycle systems after the pure crystallized dinitrile has been separated is also advantageous as regards expenditure of energy. According to the invention the impurities are removed from the dinitrile without the whole of the mother liquor having to be processed. It is sufficient for only a small portion of the mother liquor to be processed continuously as described above. Adiponitrile processed according to the invention may for example be hydrogenated to 1,6-hexamethylenediamine which in turn can be used for the production of polyamides.

The following Example illustrates the invention.

EXAMPLE

97% by weight crude adiponitrile (setting point about 1° C.) is continuously passed upward through a cylindrical crystallizer having a rotating displacement means provided with scrapers. Liquid ammonia having the boiling temperature −8° C. is passed through a cooling jacket around the crystallizer. The throughput of the dinitrile is regulated so that a 50% by weight suspension of crystals is discharged from the crystallizer. The weight of ammonia passed through the cooling jacket per unit time is 2.5 times the weight of vaporized ammonia which is necessary to absorb as heat of evaporation the heat of crystallization evolved by the adiponitrile. The crystal mash discharged from the crystallizer is passed continuously through a receiver to a pusher centrifuge in which it is separated into crystals and mother liquor. The mother liquor in an amount of 74% by weight is returned immediately to the crystallizer. The rest of the mother liquor is purified continuously by distillation and then returned to the crystallizer. The crystals are washed with about one quarter of their weight of molten pure dinitrile. This washing dinitrile is united with some of the mother liquor and supplied immediately to the crystallizer. The crystals are practically colorless and exhibit a purity of more than 99.9% in gas chromatographic analysis.

We claim:

1. A process for the continuous purification of adiponitrile by continuously passing the adiponitrile to be purified through a crystallizing zone with cooling thereof so that a suspension of finely divided solid adiponitrile in molten adiponitrile is formed, separating the solid adiponitrile from the molten adiponitrile, washing the solid dinitrile with liquid adiponitrile and recovering pure adiponitrile crystals, and returning the separated adiponitrile mother liquor to the crystallizing zone wherein the cooling of the adiponitrile to be purified is carried out indirectly by evaporating liquid ammonia which is passed through a cooling jacket of said crystallization zone, the amount by weight of liquid ammonia passed through the cooling jacket per unit time being one to five times the amount of ammonia, as heat of evaporation thereof, necessary to absorb the heat evolved by the crystallization of adiponitrile in said zone, and the mother liquor obtained after separation of the solid dinitrile obtained is separated into two unequal portions of 55–90% and 10–45% by weight of the total mother liquor of which the larger portion is returned immediately to the crystallization zone and the smaller portion is distilled before it is returned to the crystallization zone.

2. A process as claimed in claim 1 wherein the adiponitrile suspension contains from 30 to 50% by weight of solid adiponitrile.

3. A process as claimed in claim 1 wherein the liquid ammonia used for cooling has a temperature of from −18° to −6° C.

4. A process as claimed in claim 3 wherein the said temperature range is from −12° to −6° C.

5. A process as claimed in claim 1 wherein the adiponitrile crystal suspension is allowed to stand prior to being separated.

6. A process as claimed in claim 1 wherein the crystals in the suspension have a particle size of from 0.1 to 1 mm.

7. A process as claimed in claim 6 wherein said size range is from 0.2 to 0.5 mm.

8. A process as claimed in claim 1 wherein the liquid adiponitrile used for washing the adiponitrile crystals is obtained by melting a portion of the pure adiponitrile crystals.

9. A process as claimed in claim 8 wherein the adiponitrile used for washing is returned to the crystallization zone.

10. A process as claimed in claim 1 wherein the larger of the two unequal portions of mother liquor is from 65 to 85% by weight of the same.

References Cited

UNITED STATES PATENTS

| 3,370,082 | 2/1968 | Eisfeld et al. | 260—465.8 R |
| 3,657,315 | 4/1972 | Wegerich et al. | 260—465.8 R |
| 3,493,597 | 2/1970 | Campbell et al. | 260—465.8 R |

FOREIGN PATENTS

| 1,190,929 | 8/1963 | Germany | 260—465.8 |

JOSEPH P. BRUST, Primary Examiner